United States Patent
Yoo et al.

(10) Patent No.: US 7,539,333 B2
(45) Date of Patent: May 26, 2009

(54) SYSTEM AND METHOD FOR PROCESSING HUMAN BODY IMAGE

(75) Inventors: Done Sik Yoo, Seoul (KR); Woo Young Choi, Kyungki-do (KR); Je Hoon Yun, Daejeon (KR); Myung Hwan Seo, Kyungki-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 868 days.

(21) Appl. No.: 10/987,227

(22) Filed: Nov. 12, 2004

(65) Prior Publication Data
US 2005/0111715 A1    May 26, 2005

(30) Foreign Application Priority Data
Nov. 20, 2003    (KR)    ............... 10-2003-0082639

(51) Int. Cl.
*G06K 9/00* (2006.01)
(52) U.S. Cl. ................................ 382/128; 382/173
(58) Field of Classification Search ............ 382/128, 382/131, 132, 173, 180; 128/922
See application file for complete search history.

(56) References Cited

U.S. PATENT DOCUMENTS 5,982,917 A * 11/1999 Clarke et al. ............... 382/132
2003/0053667 A1 * 3/2003 Paragios et al. ............ 382/128
2003/0174872 A1 * 9/2003 Chalana et al. ............ 382/128
2005/0190955 A1 * 9/2005 Brown ....................... 382/128

FOREIGN PATENT DOCUMENTS

KR    1020030018792 A    3/2003

* cited by examiner

*Primary Examiner*—Andrew W Johns
(74) *Attorney, Agent, or Firm*—Blakely, Sokoloff, Taylor & Zafman LLP (57) ABSTRACT

Provided is a system and method for semi-automatically processing a human body image. A segmentation unit segments portions having correlations with one another in a human body image using at least one of image processing functions. A feedback unit performs at least one of the image processing functions on the segmented human body image to improve accuracy of the segmented human body image. A classification unit applies corresponding colors to tissues of the segmented human body image, incorporates the segmented human body image into one image, and creates an image in which classification is completed. A display unit shows images that are results of processing by the segmentation unit, the feedback unit, and the classification unit on independent screen windows.

9 Claims, 6 Drawing Sheets
(4 of 6 Drawing Sheet(s) Filed in Color)

SYSTEM AND METHOD FOR PROCESSING HUMAN BODY IMAGE

BACKGROUND OF THE INVENTION

This application claims the priority of Korean Patent Application No. 2003-82639, filed on Nov. 20, 2003, in the Korean Intellectual Property Office, the disclosure of which is incorporated herein in its entirety by reference.

1. Field of the Invention

The present invention is related to a system and method for processing a human body image, and more particularly, to develop a semi-automated system for human image processing with which tissues or organs from human images can be segmented and classified by people who have basic knowledge of image processing. In addition, the proposed image processing system is independent on any types of human tissues or images.

2. Description of the Related Art

A high resolution human model is necessary in order to analyze electromagnetic field (EMF) effects exposed on human body by telecommunication devices. A high resolution human model can be developed by segmenting human images such as magnetic resonance imaging (MRI) images and computed tomography (CT) images. The segmented images can be reconstructed to a 3D model with information of anatomical structures.

Although segmentation of meaningful tissues in the MRI or CT images is a must task, the MRI or CT images cannot show all the tissues of a human body due to their unique characteristics. As a result, there is no program for automatic and perfect segmentation.

In general, segmentation of MRI or CT images for constructing the high resolution human body model is done manually such that regions to be segmented are drawn by hand on MRI or CT images and the resulting images are input to a computer using a general-purpose graphic software.

Manual segmentation offers reliable results but it is very labor- and time-intensive. In particular, the results of segmentation significantly differ depending on skills of those who perform segmentation. In other words, since tissues in every image should be checked with eyes and edges of the tissues should be drawn by hand, manual segmentation requires a high level of knowledge and experience and inevitably depends on experts.

Also, since manual segmentation requires high concentration, even experts cannot handle a limited amount of tasks in a day. When the general-purpose image processing software is used, it often does not provide user's desired functions or is very inconvenient for specific purposes.

Although a fully automated image processing system using computer algorithms exists, its operation is limited to processing of images of specific tissues such as brains, stomachs, or livers, or it should use a specific image like T1-weighted MR images or T2-weighted MR images that emphasize a specific portion of a human body. An automatic image processing system can save user's time and effort, but the accuracy of processing results is low. Such a limit of the automatic image processing system can be overcome by a semi-automatic image processing system that is a product of combination of advantages of manual and automatic image processing systems.

Thus, there is an urgent requirement for development of an image processing system that has the advantage of saving user's time and effort and functions required for segmentation of MRI and CT images and is independent of specific tissues of a human body or specific images.

SUMMARY OF THE INVENTION

The present invention provides a system and method for semi-automatically processing a human body image, which processes images of all the tissues of a human body without a limitation to an image of a specific human tissues or a specific image and provides a high resolution human body model.

The present invention also provides a computer-readable recording medium having embodied thereon a program for a method for semi-automatically processing a human body image, which processes images of all the human tissues without a limitation to an image of specific human tissues or specific images and provides a high resolution human body model.

According to an aspect of the present invention, there is provided a system for processing a human body image. The system comprises a segmentation unit, a feedback unit, a classification unit, and a display unit. The segmentation unit segments portions having correlations with one another on a human body image using at least one of the image processing functions. The feedback unit performs at least one of the image processing functions on the segmented human body image in order to improve accuracy of the segmented human body image. The classification unit applies corresponding colors to tissues in the segmented human body image, incorporates the segmented human body image into one image, and creates an image in which classification is completed. The display unit shows the images of the results from the segmentation unit, the feedback unit, and the classification unit as independent screen windows.

According to another aspect of the present invention, there is provided a method for processing a human body image. The method comprises (a) segmenting portions having correlations with one another in a human body image using at least one of the image processing functions, (b) performing at least one of the image processing functions on the segmented human body image in order to improve accuracy of the segmented human body image, (c) applying corresponding colors to tissues of the segmented human body image, incorporating the segmented human body image into one image, and creating an image in which classification is completed, and (d) displaying the images of the results from the segmentation unit, the feedback unit, and the classification unit as independent screen windows.

Thus, it is possible to obtain a high resolution human body model that allows segmentation and classification with respect to all the tissues of a human body and to obtain human body images which help analyzing the EMF effects upon the human body by applying a human tissue classification table recommended by FCC during the classification.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other features and advantages of the present invention will become more apparent by describing in detail an exemplary embodiment thereof with reference to the attached drawings in which.

DETAILED DESCRIPTION OF THE INVENTION

Figure 1:
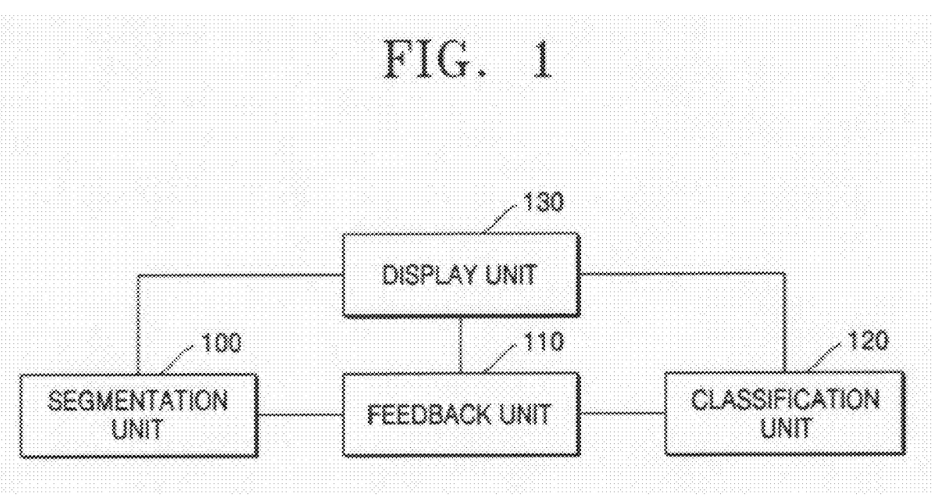
FIG. 1 shows a system for processing a human body image, according to the present invention.

FIG. 1 shows a system for processing a human body image, according to the present invention.

Referring to FIG. 1, the system for processing a human body image according to the present invention includes a segmentation unit 100, a feedback unit 110, a classification unit 120, and a display unit 130.

The display unit 130 shows a digital image that is subject to human body image processing according to the present invention and the results of image processing by means of the segmentation unit 100, the feedback unit 110, and the classification unit 120. The display unit 130 shows the results of image processing by means of the segmentation unit 100, the feedback unit 110, and the classification unit 120 on independent screen windows.

Therefore, users can easily visually compare and review the results of the human body image processing of respective steps. Also, when users desire to perform feedback and classification on one of the human body images displayed on independent screen windows, they can easily select an image of interest using an input/output device such as a computer mouse and perform feedback and classification on the selected image.

In the present invention, the system for semi-automatically processing images of a human body is provided to overcome the disadvantages of fully-automated human body image processing system, i.e., imperfection and low accuracy, and achieve the advantage of manual processing, i.e., high accuracy. To this end, since the present invention makes it possible to perform predetermined segmentation and feedback procedures on human body images using various combinations of digital image processing functions, it is important to display the results of human body image processing of respective steps on independent screen windows. For example, if there are five digital image processing functions A through E, users can select only the function A or the functions A and C and obtain the human body images to which the selected function(s) is(are) applied, or can use all the functions A through E and obtain the human body images to which the functions A through E are applied. Also, the obtained images are displayed on independent screen windows. Therefore, the results of image processing can be compared and more precise results of the human body image processing can be obtained through feedback on a result of the comparison.

Hereinafter, elements for the human body image processing will be described.

The segmentation unit 100 groups portions having correlations with one another in MRI, CT, ultrasound, or X-ray digital human body images. To group objects or portions of objects in images, the segmentation unit 100 use predetermined digital image processing functions.

The digital image processing functions include thresholding (multi, single), Boolean operation, image inversion, edge detection, histogram equalization, region growing, and mathematical morphology (erosion, dilation, opening, closing). Hereinafter, each of the digital image processing functions will be described.

Thresholding (multi, single): This function concerns binarization of an image that involves setting a threshold value and converting a pixel into black (0) if the brightness of the pixel is less than the threshold value and into white (255) if the brightness of the pixel is greater than the threshold value. There may be one threshold value (single thresholding) or two threshold values (multi thresholding).

Boolean operation: This function involves combining two images in order to creating a new image applying the operation such as AND, OR and XOR.

Image inversion: This function involves creating an image having contrast that is the inverse of the original image by inverting the original image.

Edge detection: This function involves searching for edges of a region to be segmented using an edge operator.

Histogram equalization: This function involves creating a histogram having a predetermined distribution and spreading brightness values concentrated in a specific spot, thereby obtaining a histogram having uniform brightness distribution.

Region growing: This function involves separating a region corresponding to an object to be segmented by combining adjacent regions having high correlations with a reference value in an image.

Mathematical morphology (erosion, dilation, opening, closing): This function involves correcting an image using erosion, dilation, opening, and closing to correct a region of interest of a tissue to be segmented or remove unnecessary portions of the image.

The digital image processing functions show an example of image processing functions, and therefore, another image processing algorithm can be applied to the system for processing the human body images according to the present invention.

Figure 3:
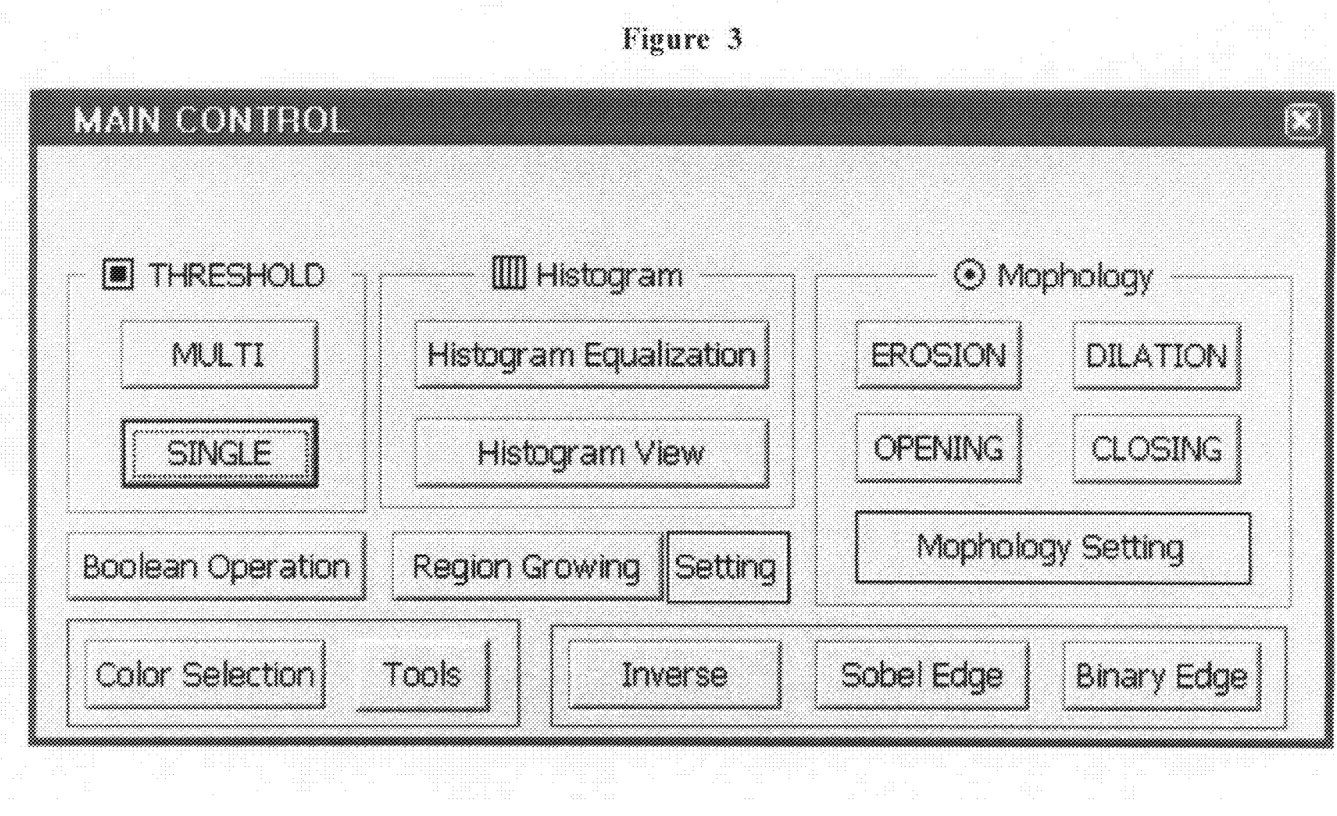

The segmentation unit 100 shows a group of the digital image processing functions on a screen, so that users can intuitively see and easily operate the digital image processing functions. A screen configuration provided by the segmentation unit 100 is shown in FIG. 3. The segmentation unit 100 performs at least one digital image processing function for one human body image. The results of image processing are displayed on a independent screen window of the display unit 130.

The feedback unit 110 again performs the digital image processing functions on the human body image obtained from the segmentation unit 100 to get a high resolution result. In other words, a more precise human body image can be created by applying at least one digital image processing function to the human body image obtained from the segmentation unit 100. The feedback unit 110 provides reference images 240 that provide information about which digital image processing function can be applied to the human body image obtained from the segmentation unit 100 to get a better result.

During segmentation, user's subjective decision is often required because edges of a specific region are uncertain due to characteristics of medical images. Since user's subjective decision on uncertain regions often affects the results of the human body image processing, segmentation is conventionally performed with reference to human anatomy textbooks. As a result, users should stop computer tasks to look up the textbook.

Therefore, in the present invention, images that are segmented by anatomy experts during feedback are provided for use as the reference images 240, so as to make it possible to perform all tasks on a computer. The reference images 240 are advantageous in that they minimize the occurrence of problems caused by subjective decision and are convenient to use.

The feedback unit 110 can repetitively perform the digital image processing functions until satisfying results are obtained from the segmentation unit 100. Processing results of the feedback unit 110 are displayed on one or several independent windows. When the processing results of the feedback unit 110 are displayed on independent windows, it is possible to restart feedback from the previous human body image.

After the tissues in the human body image are segmented, the segmented images can be categorized applying the different colors in the classification unit 120. The colored images can be integrated into a final classified image.

The classification unit 120 selects a tissue of the human body image segmented according to the present invention, which is matched to a tissue listed in a human tissue classification table 230, in which 43 Federal Communication Commission (FFC) recommended tissues are classified, and applies a corresponding color to the tissue. The human tissue classification table 230 recommended by FCC provides a dielectric constant and an electric conductivity that are constants showing electrical characteristics of a human tissue. Thus, by coloring each tissue of the human body image based on the human tissue classification table 230 recommended by FFC, it is possible to analyze the EMF effects upon a human body.

FIGS. 2 through 5 show a screen configuration provided by the system for processing a human body image according to the present invention.

Figure 2:
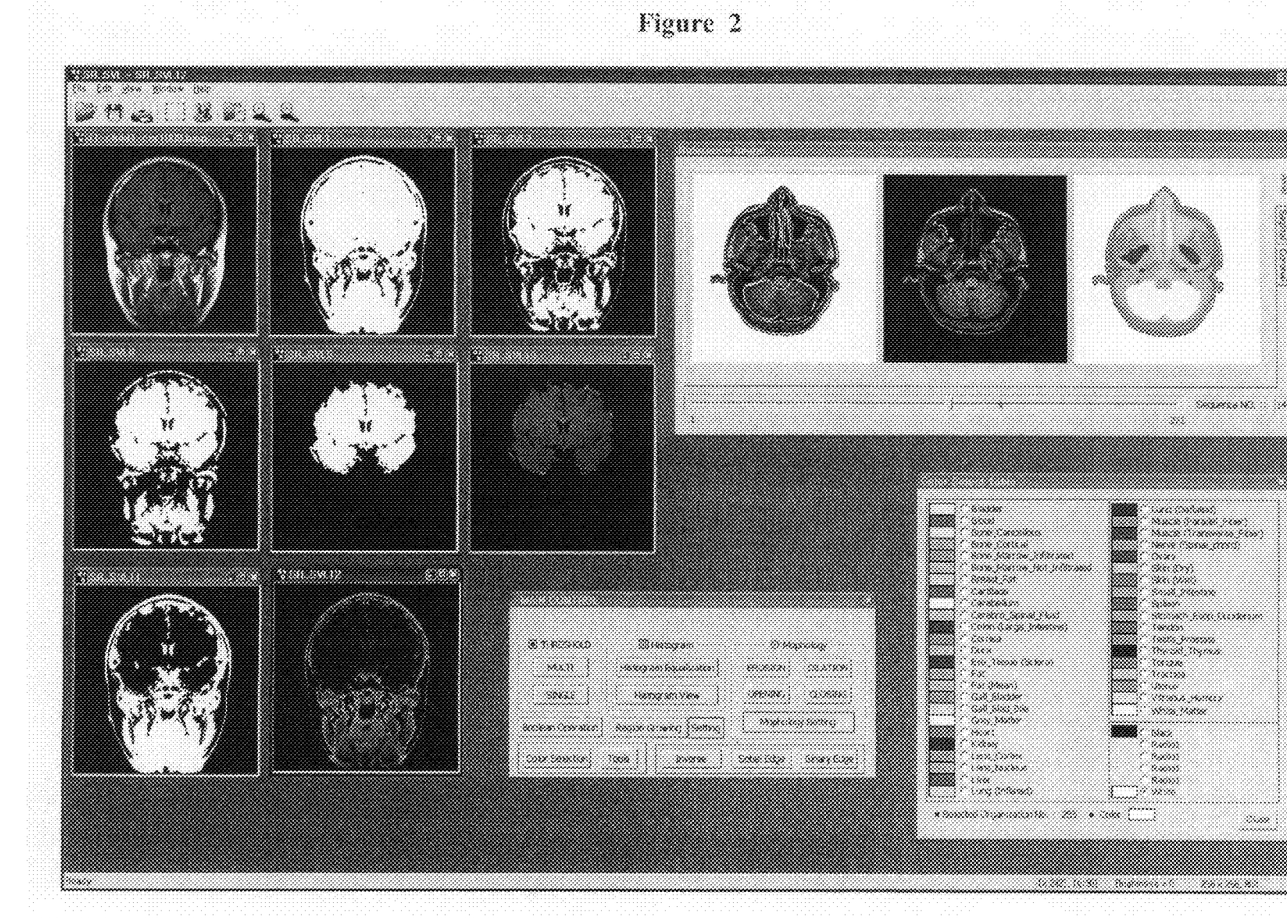
FIGS. 2 through 5 show a screen configuration provided by the system for processing a human body image according to the present invention.

Referring to FIG. 2, the screen configuration provided by the system for processing human body images includes human body images 210 displayed on independent screen windows by the display unit 130, a control panel 220 in which there are the digital image processing functions that are performed by the segmentation unit 100, the reference images 240 that help users to select the digital image processing functions through the feedback unit 110, and the human tissue classification table 230 recommended by FCC.

Each of the human body images 210 displayed in the display unit 130 shows a result of processing a read-in digital human body image by the segmentation unit 100 and the feedback unit 110. Users can compare and review human body images displayed for each processing step, optionally select a result of a processing step, and cause the feedback unit 110 to perform the digital image processing functions.

Referring to FIG. 3, the digital image processing functions are located on the control panel, which consists of an intuitive and independent menu with a simple structure. Each of the digital image processing functions can be selected using computer input/output devices such as a mouse or pen. Once at least one of the digital image processing functions is selected and at least one of the independent screen windows of the human body images 210 displayed in the display unit 130 is selected, the segmentation unit 100 obtains results of digital image processing by applying the selected digital image processing function to the selected screen window. The display unit 130 shows the results of digital image processing on independent screen windows.

Figure 4:
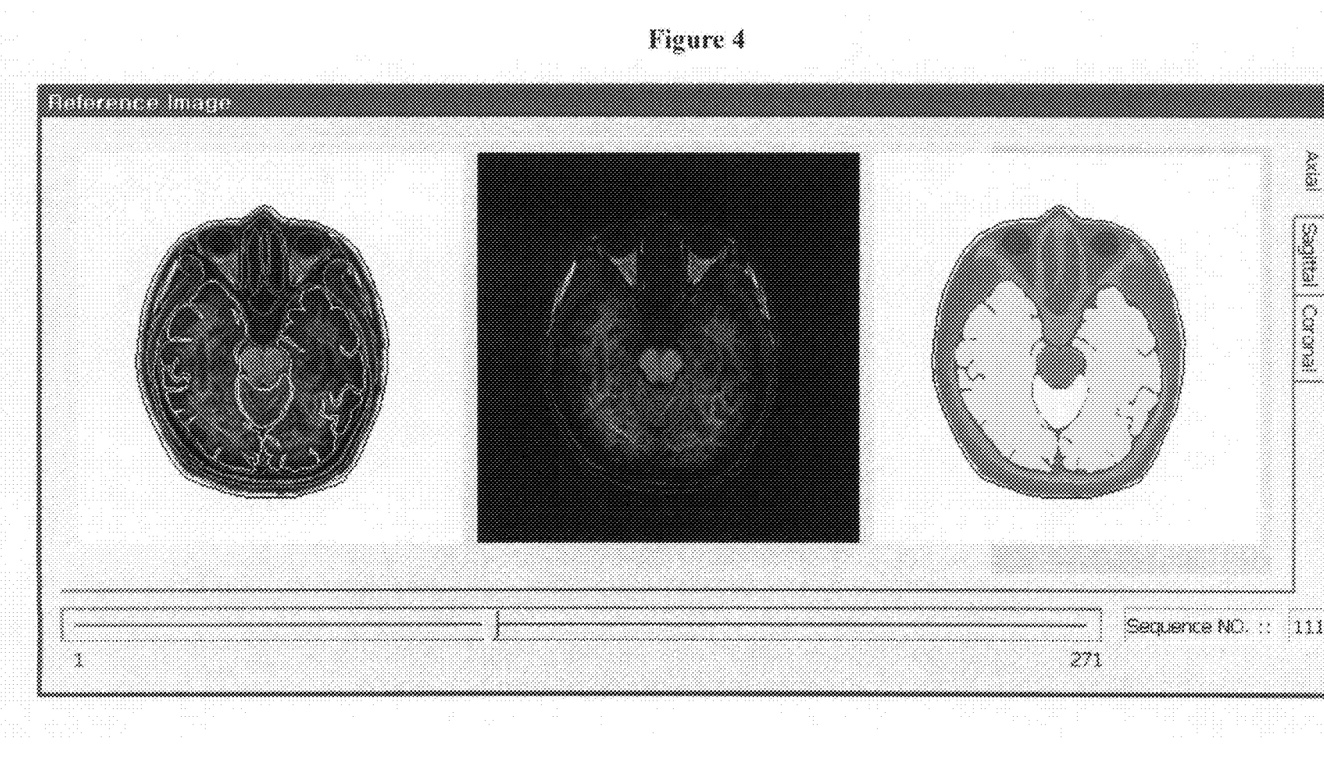

After the results of digital image processing displayed on the display unit 130 are compared with the reference images 240 shown in FIG. 4 and at least one of the digital image processing functions to be applied to some of the results of digital image processing is selected, the feedback unit 110 creates more precise images by applying the selected digital image processing function to the result images. The display unit 130 shows resulting images on independent screen windows like the human body images 210.

Figure 5:
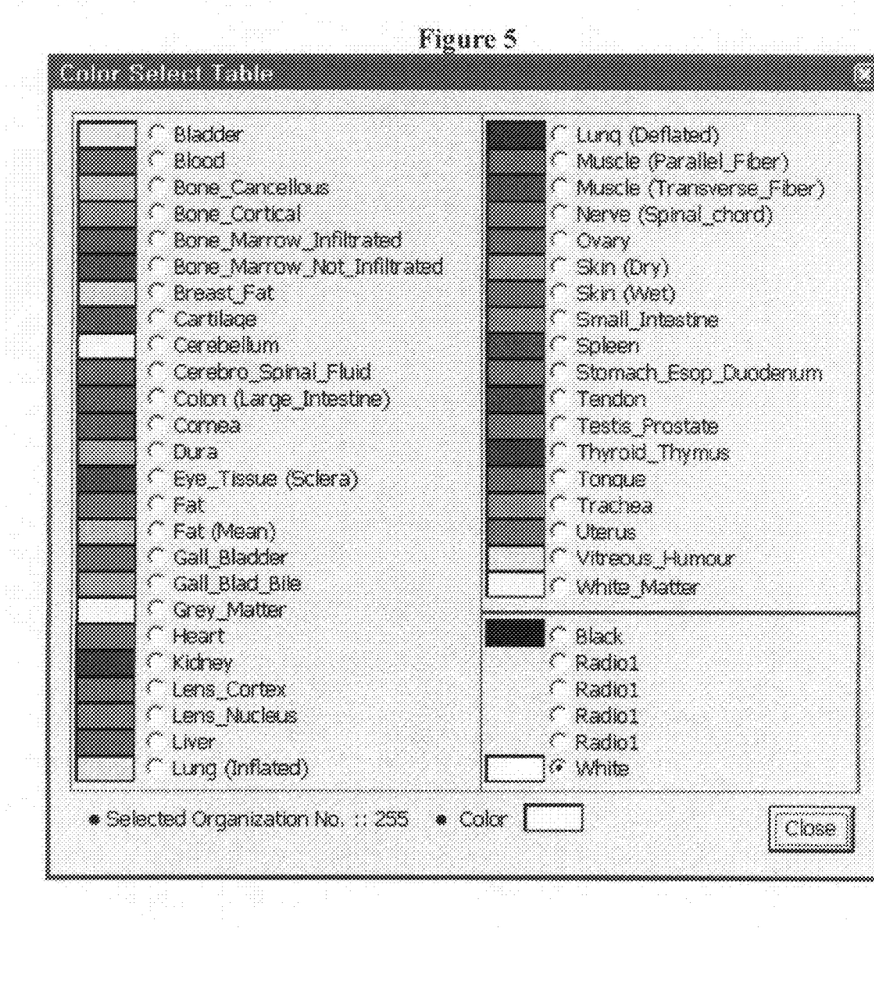

Referring to FIG. 5, the human tissue classification table 230 in which 43 FCC recommended tissues are classified is shown. The classification unit 120 selects tissues listed in the human tissue classification table 230 recommended by FCC, which are to be applied to the segmented human body images 210 displayed by the display unit 130. Then, the classification unit 120 applies colors corresponding to the selected tissues listed in the human tissue classification table 230 to tissues of the human body images 210. Thus, each of the tissues is segmented and human body images that reflect electrical characteristics according to colors are obtained. The classification unit 120 incorporates the human body images 210 that are segmented and displayed on independent screen windows into one image, thereby creating the human body image in which tissue classification is completed.

Figure 6:
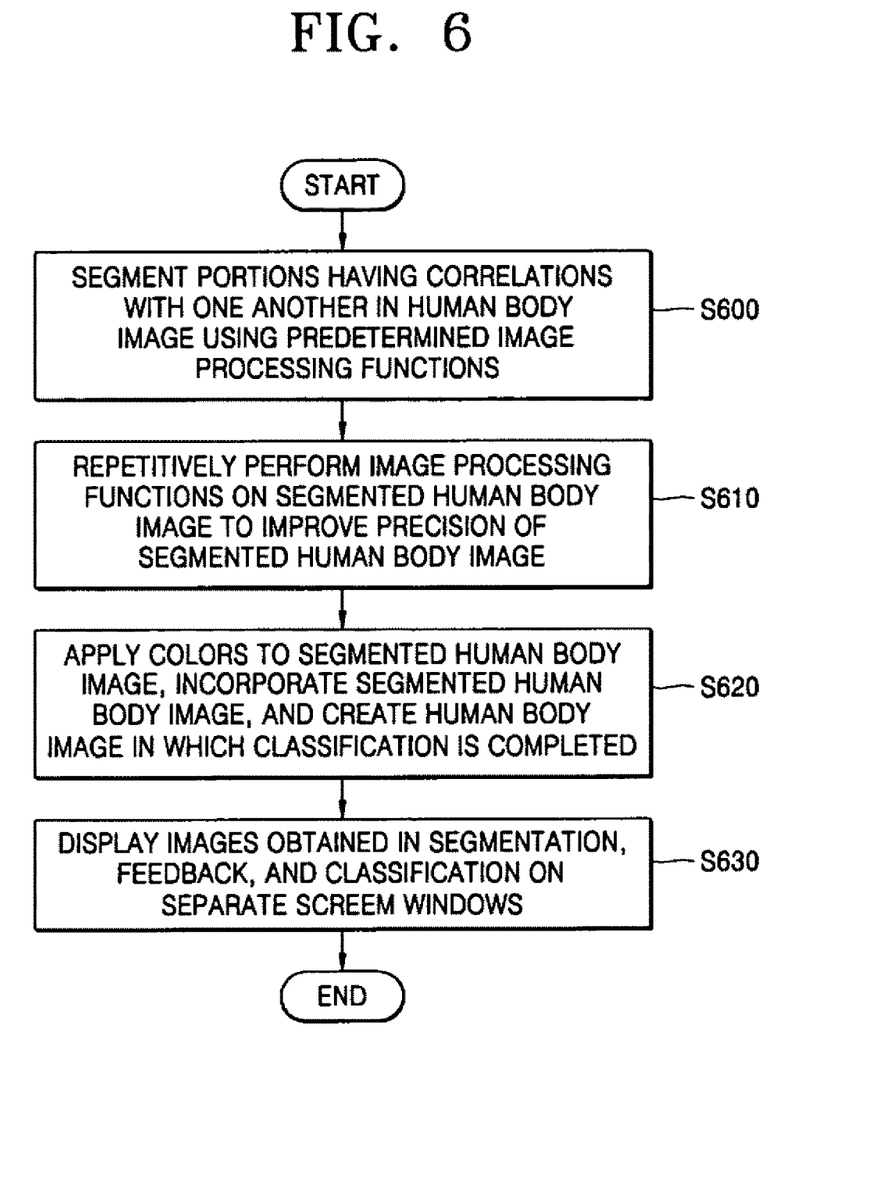
FIG. 6 is a flowchart illustrating a method for processing a human body image, according to the present invention.

FIG. 6 shows a flowchart illustrating a method for processing a human body image, according to the present invention.

Referring to FIG. 6, the segmentation unit 100 segments portions having correlations with one another in MRI, CT, ultrasonic, or X-ray images by performing predetermined digital image processing functions, in step S600. The segmentation unit 100 activates its control panel 220 to perform image processing, i.e., to segment desired tissues.

The control panel 220 of the segmentation unit 100 includes thresholding(multi, single), Boolean operation, image inversion, edge detection, histogram equalization, region growing, mathematical morphology(erosion, dilation, opening, closing), deleting, and filling.

The selection and orders of the digital image processing functions can be determined by users according to kinds of images and the goal of image processing. In other words, users can make creative image processing algorithms by varying orders of selection and application of the digital image processing functions.

The feedback unit 110 applies the digital image processing functions selected based on the reference images 240 to the segmented images to improve the segmentation results, in step S610. Users perform comparison and analysis by comparing the results, which are obtained by combinations of the digital image processing functions in the control panel 220 of the segmentation unit 100, with the reference images 240 that are produced by experts and perform feedback through the feedback unit 100.

In general, image processing using gray levels of images has a limit such that it cannot accurately distinguish an object of interest in an image like a human body image, e.g., an MRI image, which has irregular changes in its brightness. When the results of comparison and analysis are not satisfying, various digital image processing functions of the control panel 220 of the classification unit 100 are applied to the segmented images until satisfying results come out.

The images created by the segmentation unit 100 and the feedback unit 110 undergo procedures, so as to be recognized as specific tissues of user's interest, and are then stored in a storage device. Tissues that are segmented by users are matched with tissues listed in the human tissue classification table 230 recommended by FCC, correct tissues are searched, and colors corresponding to the correct tissues are applied to the segmented tissues, thereby obtaining a final resulting image. To analyze the influence of EMF effects upon a human body, a dielectric constant and an electric conductivity that are constants showing electrical characteristics of a human tissue are required, and the 43 human tissue classification table 230 recommended by FCC provides them.

The display unit 130 shows digital human body images obtained using MRI or CT, human body images segmented by the segmentation unit 100, images processed by the feedback unit 110, and human body images processed by the classification unit 120 on independent screen windows, in step S630. Since the display unit 130 provides the human body images 210 on independent screen windows, users can compare and analyze the human body image processing results obtained in respective steps and perform segmentation, feedback, and classification on the human body image processing results obtained in a specific step.

According to the present invention, by displaying the results of human image processing that are obtained in respective steps on independent screen windows and repetitively performing image processing on images displayed on the independent screen windows, the disadvantages of fully automated human body image processing systems such as imperfection in and low accuracy of human body image processing can be overcome. Also, by repetitively performing human body image processing functions based on reference images, the advantage of manual tasks, i.e., high accuracy can be achieved.

Unlike conventional automatic human body image processing systems that process only an image of a specific tissue or a specific image, human body images can be created by performing segmentation and classification on all the tissues of a human body. In particular, by using a human tissue classification table recommended by FCC during classification, it is possible to obtain a human body image that helps analyzing the influence of EMF effects upon a human body.

The present invention can also be embodied as a computer readable code on a computer-readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network connected computer systems so that the computer readable code is stored and executed in a distributed fashion.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A system for processing a human body image, the system comprising: a segmentation unit segmenting portions having correlations with one another in a human body image using at least one of image processing functions; a feedback unit performing at least one of the image processing functions on the segmented human body image to improve accuracy of the segmented human body image; a classification unit applying corresponding colors to tissues in the segmented human body image, incorporating the segmented human body image into one image, and creating an image in which classification is completed; and a display unit displaying images that are results of processing by the segmentation unit, the feedback unit, and the classification unit on independent screen windows.

2. The system of claim 1, wherein the segmentation unit segments the human body image using at least one operation among digital image processing operations including thresholding, Boolean operation, image inversion, edge detection, histogram equalization, region growing, and mathematical morphology.

3. The system of claim 1, wherein the feedback unit selects at least one of the images that are displayed on the independent screen windows and performs at least one of the image processing functions.

4. The system of claim 1, further comprising a reference image unit that provides reference images that are necessary for segmentation and feedback of the human body image.

5. The system of claim 1, wherein the classification unit applies colors that are classified according to electrical characteristics of human tissues to the corresponding tissues.

6. A method for processing a human body image, the method comprising: (a) segmenting portions having correlations with one another in a human body image using at least one of image processing functions; (b) performing at least one of the image processing functions on the segmented human body image to improve accuracy of the segmented human body image; (c) applying corresponding colors to tissues of the segmented human body image, incorporating the segmented human body image into one image, and creating an image in which classification is completed; and (d) displaying images that are results of processing by the segmentation unit, the feedback unit, and the classification unit on independent screen windows.

7. The method of claim 6, further comprising providing reference images that are necessary for segmentation and feedback of the human body image.

8. The method of claim 6, wherein in (b), at least one of the images displayed on the independent screen windows in (d) is selected and at least one of the image processing functions is performed on the selected human body image.

9. The method of claim 6, wherein in (c), colors that are classified according to electrical characteristics of human tissues are applied to corresponding tissues.

* * * * *